July 14, 1970 G. L. FULTON 3,520,642
MOTOR DRIVEN PUMP
Filed Oct. 29, 1968

INVENTOR
GARLAND L. FULTON

BY
ATTORNEY

United States Patent Office 3,520,642
Patented July 14, 1970

3,520,642
MOTOR DRIVEN PUMP
Garland L. Fulton, Wayne, Pa., assignor to Process Industries, Incorporated, Huntingdon Valley, Pa., a corporation of Pennsylvania
Filed Oct. 29, 1968, Ser. No. 771,571
Int. Cl. F04d *13/02;* H02k *5/10*
U.S. Cl. 417—420         9 Claims

ABSTRACT OF THE DISCLOSURE

An electromagnetic driven pump in which the pump impeller is journaled on a fixed shaft and is driven by a magnetic coupling member which is of soft iron, or of high intensity permanent magnetic material of metal or of ceramic. The coupling member is driven by a rotatable electromagnetic device which is in turn motor driven. The coupling members are isolated to prevent fluid communication therebetween.

BACKGROUND OF THE INVENTION

Field of the invention

This invention relates to fluid pumps having high performance magnetic couplings to driving motors.

Description of the prior art

It has heretofore been proposed to provide couplings for driving fluid impellers which couplings employed permanent magnets with a gap therebtween. The arrangement heretofore employed had limited flux density and with higher horsepower units difficulties occurred in starting due to inertia and slipping. With the structures heretofore proposed, also, demagnetization occurs with ageing, thereby reducing the effectiveness of the coupling.

If the magnets of one component of the coupling were enclosed or encased this frequently resulted in a loss of part of the magnetic effect so as to reduce the available force.

SUMMARY OF THE INVENTION

In accordance with the invention a drive coupling for pumps is provided having interacting magnetic coupling components, one of which is motor driven, and one of which is energized from a source of electric energy, the components being shielded and isolated from fluid communication therebetween while being adequately supported.

It is the principal object of the present invention to provide a drive coupling for pumps which is simple in construction and free from inertia effects and slipping in use.

It is a further object of the present invention to provide a high power magnetic coupling and pump impeller drive which is suitable for use for transmission of many horsepowers.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawing forming part thereof, in which.

Figure 1:
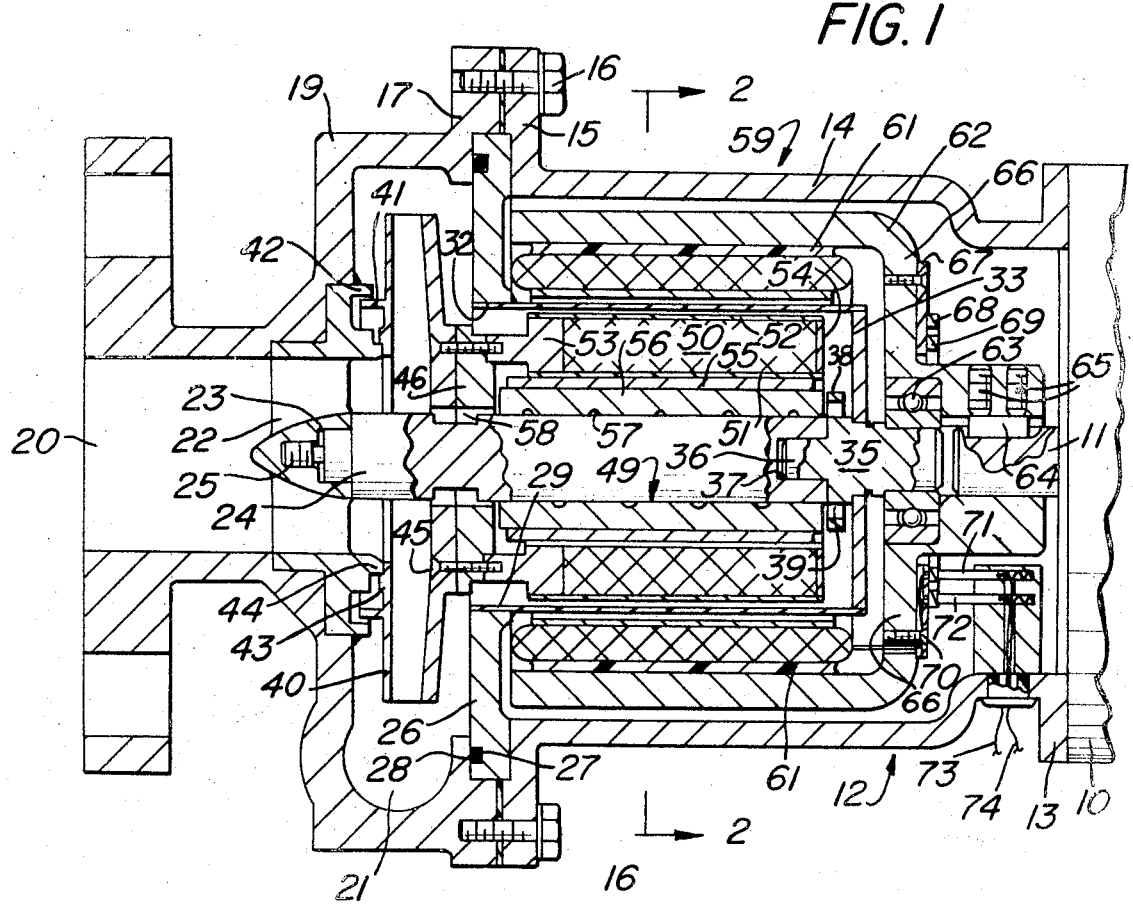
FIG. 1 is a longitudinal central sectional view of a motor driven pump having a magnetic coupling in accordance with the invention.
Figure 2:
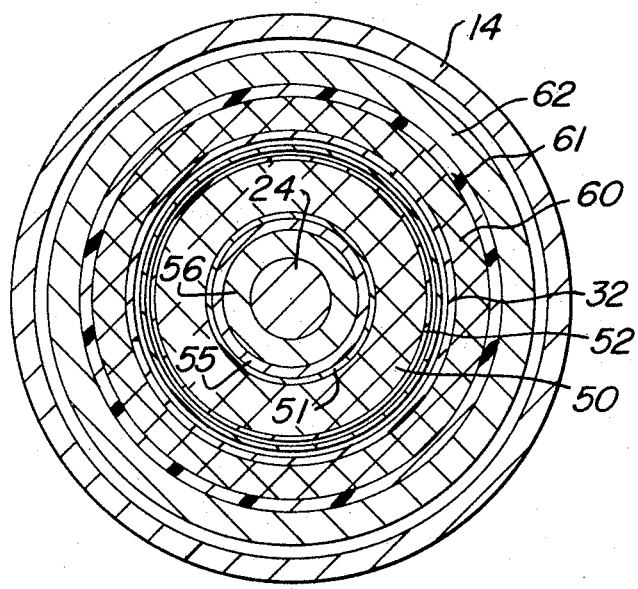
FIG. 2 is a transverse sectional view taken approximately on the line 2—2 of FIG. 1.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings, an electric motor 10 is shown having a shaft 11 extending into an open end of a coupling housing 12 with an end flange 13 which can be secured to the housing of the motor 10 in any desired manner.

The coupling housing 12 has a generally cylindrical central portion 14 and an opposite end flange 15.

The end flange 15 has detachably secured thereto, such as by bolts 16, the flange 17 of an impeller housing 19. The impeller housing 19 has a fluid inlet 20 and a scroll 21 of well known type with a fluid delivery connection (not shown).

The impeller housing 19 has mounted in the inlet 20 a spider 22 with a central boss 23 with which one end 25 of a fixedly mounted shaft 24 is in threaded engagement.

The flanges 15 and 17 have interposed therebetween a mounting plate 26, which may have a groove 27 therein for the reception of a packing 28, such as an O-ring, for preventing fluid leakage from the impeller housing 19 at this location.

The mounting plate 26 has a central opening 29 at which a cylindrical isolating sleeve 32 is secured in fluid tight relation, such as by welding. The other end of the sleeve 32 is closed by a plate 33, also preferably welded thereto. The sleeve 32 and plate 33 are preferably of nonmagnetic responsive material such as stainless steel.

The plate 33 has secured thereto, such as by welding, a fixed stub shaft 35. The stub shaft 35 has a cylindrical end portion 36, of reduced size, for engagement in a complemental opening 37 in the shaft 24.

The stub shaft 35 also has a limit stop ring 38 fixed thereon with openings 39 for fluid circulation.

The impeller assembly includes a fluid impeller 40. The fluid impeller 40 has a cylindrical flange 41 for sliding movement with respect to a complemental outer flange 42 on the spider 22 and has a rim 43 in overlapping relation to a flange 44 on the spider 22 to reduce leakage from the scroll 21 to the inlet 20.

The impeller 40 is detachably secured, such as by studs 45 through an impeller mounting plate 46 to a cylindrical magnetic responsive unit 49.

The magnetic responsive unit 49 preferably includes a magnet element 50 encased by interior and exterior cylindrical enclosures 51 and 52, closed at the ends by end closures 53 and 54, all the encasing elements preferably being of noncorrosive non-magnetic responsive material. A clearance space is provided between the enclosure 52 and sleeve 32 for fluid circulation.

The magnetic element 50 can be of any desired material, such as soft iron, or high intensity metallic or ceramic material, and with the desired number and arrangement of poles in accordance with the particular design requirements.

The magnetic responsive unit 49 is mounted on a bearing sleeve 55 within which a cylindrical bearing 56 is provided. The bearing 56 can be made of any desired material, such as graphite or carbon, and is in bearing engagement with the fixed shaft 24. A helical lubricant circulating groove 57 can be provided for return of fluid through a passageway 58 to the suction part of the impeller 40.

The stop ring 38 limits the movement along the axis of the shaft 24 of the magnetic responsive unit 49 and the impeller 40 towards the right as seen in FIG. 1.

In surrounding relation to the magnetic responsive unit 49, and outside the sleeve 32, an electromagnetic driving unit 59 is provided which includes a plurality of flux producing windings 60 mounted on pole pieces 61 carried by a hollow cylindrical or cup shaped carrier 62.

The carrier 62 is journaled on a bearing 63 carried on the fixedly mounted stub shaft 35 and is connected to the motor shaft 11, such as by a key 64 and set screws 65.

The carrier 62 has an end wall 66 on which a slip ring 67 with two electrically insulated conductor rings 68 and 69 is secured by screws 70. The conductor rings 68 and 69 are connected to the windings 60 for energization thereof, and brushes 71 and 72, connected by conductors 73 and 74 to any suitable source of electrical energy provide the desired flux pattern and intensity at the pole pieces 61.

The mode of operation will now be pointed out.

The conductors 73 and 74 are connected to a source of electric energy and through the brushes 71 and 72 and conductor rings 68 and 69 energize the windings 60 and pole pieces 61 to produce a flux pattern which couples with the magnetic responsive elements 50 to drive the magnetic responsive unit 49 and the impeller 40 connected thereto upon rotation of the motor shaft 11.

The conductor rings 68 and 69, the brushes 71 and 72, and conductors 73 and 74 are all isolated from the fluid by the sleeve 32 and its end closure 33.

It will be noted that a portion of the fluid being pumped is available from the scroll 21 through the clearance space between the interior of the sleeve 32 and the enclosure 52 to the right end of the bearing sleeve 55 for return through the groove 57 and passageway 58 to the impeller 40. The fluid thus circulated serves to provide lubricating fluid to the bearing 56 as well as to carry off heat and aid in cooling the windings 60.

A simple but effective fluid isolating magnetic coupling for pumps is thus provided.

I claim:

1. A motor driven pump having a coupling between the motor and the pump which comprises:
   an electric motor having a shaft,
   a coupling housing, and
   an impeller housing in alignment,
   a fixedly mounted shaft member secured in said impeller housing and extending longitudinally in said coupling housing,
   a first magnetic unit within said impeller housing and having an impeller in said impeller housing connected thereto,
   a supporting bearing for said first magnetic unit journaled on said shaft member,
   a second magnetic unit withing said impeller housing in surrounding relation to said first magnetic unit,
   a supporting bearing for said second magnetic unit journaled on said shaft member,
   one of said magnetic units having flux producing windings, and means for supplying electrical energy for energizing said windings.

2. A motor driven pump as defined in claim 1, in which:
   said windings are provided in said second magnetic unit,
   said second magnetic unit includes a rotatable carrier, and
   said carrier has a conductor ring carried thereby.

3. A motor driven pump as defined in claim 1, in which:
   said impeller housing has an isolating sleeve member carried thereby interposed between said first and second magnetic units.

4. A motor driven pump as defined in claim 3, in which:
   said first magnetic unit and said sleeve have a clearance therebetween in communication with the impeller housing, and
   the supporting bearing for said first magnetic unit has a fluid return passageway in connection with said clearance space and with the impeller for circulation of fluid within said sleeve for cooling.

5. A motor driven pump as defined in claim 3, in which:
   said impeller housing has an end closure portion, and
   said shaft member includes a detachably connected shaft portion to which said end closure portion is connected.

6. A motor driven pump as defined in claim 1, in which:
   said supporting bearing for said first magnetic unit is an elongated cylindrical member.

7. A motor driven pump as defined in claim 1, in which:
   said supporting bearing for said second magnetic unit is a ball bearing.

8. A motor driven pump as defined in claim 5, in which:
   said supporting bearing for said second magnetic unit is carried by said detachably connected shaft portion.

9. A motor driven pump as defined in claim 1, in which:
   a spider is provided in said pump housing in which said fixedly mounted shaft is carried.

References Cited

UNITED STATES PATENTS

| | | | |
|---|---|---|---|
| 2,444,687 | 7/1948 | Widakowich | 103—87 XR |
| 3,144,573 | 8/1964 | Bergey et al. | 310—104 XR |

ROBERT M. WALKER, Primary Examiner

U.S. Cl. X.R.

310—104